United States Patent [19]

Avrillon et al.

[11] Patent Number: 5,071,452

[45] Date of Patent: Dec. 10, 1991

[54] GAS SEPARATION MEMBRANE

[75] Inventors: René Avrillon, Maison Laffite; André Deschamps, Noisy le Roi; Alain Driancourt, Bourg la Reine; Jean-Claude Mileo, Saint Ismier; Eric Robert, Rueil Malmaison, all of France

[73] Assignee: Institut Francais du Petrole, Rueil Malmaison, France

[21] Appl. No.: 565,845

[22] Filed: Aug. 13, 1990

[30] Foreign Application Priority Data

Aug. 11, 1989 [FR] France .................. 89 10899

[51] Int. Cl.$^5$ .................. B01D 53/22; B01D 71/64
[52] U.S. Cl. .................. 55/16; 55/68; 55/158
[58] Field of Search .................. 55/16, 68, 158, 71, 55/73

[56] References Cited

U.S. PATENT DOCUMENTS

| Re. 30,351 | 7/1980 | Hoehn et al. | 55/16 |
|---|---|---|---|
| 3,822,202 | 7/1974 | Hoehn | 55/16 |
| 4,378,324 | 3/1983 | Makino et al. | 264/41 |
| 4,378,400 | 3/1983 | Makino et al. | 55/16 X |
| 4,474,662 | 10/1984 | Makino et al. | 55/158 X |
| 4,512,893 | 4/1985 | Makino et al. | 55/158 X |
| 4,690,873 | 9/1987 | Makino et al. | 55/158 X |
| 4,705,540 | 11/1987 | Hayes | 55/158 X |
| 4,717,393 | 1/1988 | Hayes | 55/158 X |
| 4,717,394 | 1/1988 | Hayes | 55/158 X |
| 4,718,921 | 1/1988 | Makino et al. | 55/16 |
| 4,880,442 | 11/1989 | Hayes | 55/158 X |
| 4,897,092 | 1/1990 | Burgoyne, Jr. et al. | 55/16 |
| 4,932,982 | 6/1990 | Hayes | 55/158 X |
| 4,932,983 | 6/1990 | Hayes | 55/158 X |
| 4,948,400 | 8/1990 | Yamada et al. | 55/158 |
| 4,952,220 | 8/1990 | Langsam et al. | 55/158 |
| 4,954,144 | 9/1990 | Burgoyne, Jr. et al. | 55/158 X |
| 4,968,331 | 11/1990 | Sakashita et al. | 55/158 |
| 4,981,498 | 1/1991 | Hayes | 55/158 X |
| 4,983,191 | 1/1991 | Ekiner et al. | 55/158 |

FOREIGN PATENT DOCUMENTS

| 77718 | 4/1983 | European Pat. Off. |
|---|---|---|
| 90927 | 10/1983 | European Pat. Off. |
| 258556 | 3/1988 | European Pat. Off. |
| 309338 | 3/1989 | European Pat. Off. |
| 0321638 | 6/1989 | European Pat. Off. | 55/158 |
| 58-008512 | 1/1983 | Japan | 55/158 |
| 59-225705 | 12/1984 | Japan | 55/158 |
| 60-022902 | 2/1985 | Japan | 55/158 |
| 60-071023 | 4/1985 | Japan | 55/158 |
| 60-082103 | 5/1985 | Japan | 55/158 |
| 60-125210 | 7/1985 | Japan | 55/158 |
| 60-257805 | 12/1985 | Japan | 55/158 |
| 62-074410 | 4/1987 | Japan | 55/158 |
| 62-074411 | 4/1987 | Japan | 55/158 |
| 62-114628 | 5/1987 | Japan | 55/158 |
| 63-012302 | 1/1988 | Japan | 55/158 |
| 63-028424 | 2/1988 | Japan | 55/158 |
| 63-166415 | 7/1988 | Japan | 55/158 |
| 63-190607 | 8/1988 | Japan | 55/158 |
| 63-264121 | 11/1988 | Japan | 55/158 |
| 63-278524 | 11/1988 | Japan | 55/158 |
| 1-194904 | 8/1989 | Japan | 55/158 |
| 1-194905 | 8/1989 | Japan | 55/158 |

Primary Examiner—Robert Spitzer
Attorney, Agent, or Firm—Millen, White & Zelano

[57] ABSTRACT

Disclosed is a gas separation membrane, comprising a film with a thickness ranging from $0.05 \cdot 10^{-6}$ to $20 \cdot 10^{-6}$ m, at least 90% by mole of which is at least one aromatic polyimide or copolyimide, the recurrent unit of which corresponds to the following formula (I):

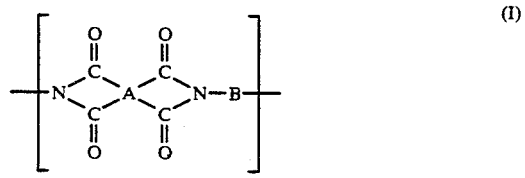

(I)

where A represents a tetravalent aromatic radical at least 50% by mole of which are represented by the following formula (II):

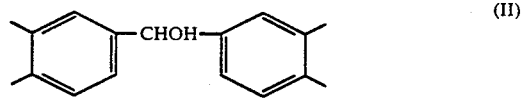

(II)

and B represents a bivalent aromatic radical or a mixture of bivalent aromatic radicals.

10 Claims, No Drawings

GAS SEPARATION MEMBRANE

BACKGROUND OF THE INVENTION

The present invention relates to a gas separation membrane comprising at least one thin film mainly containing at least one particular aromatic polyimide or copolyimide, preferably prepared from at least one tetra-ester or diacid-diester derived from 3,3',4,4'-tetracarboxylic acid.

The use of aromatic polyimides in gaseous permeation membranes has been notably described in U.S. Pat. Nos. 4,378,324, 4,378,400, 4,512,893, 4,705,540, 4,717,393, 4,717,394 and 4,718,921.

None of these patents mentions the use of 3,3',4,4'-tetracarboxylic benzhydrol acid derivatives for preparing polyimides that can be utilized for gas separation.

DETAILED DESCRIPTION OF THE INVENTION

One object of the invention is to prepare membranes with a very high thermal and chemical resistance, very satisfactory mechanical properties and showing good properties as for gas separation, notably for the dehydration of mixtures of gaseous hydrocarbons.

The gas separation membrane according to the invention comprises at least one film of a thickness advantageously ranging from $0.05 \cdot 10^{-6}$ to $20 \cdot 10^{-6}$m, preferably from $0.1 \cdot 10^{-6}$ to $15 \cdot 10^{-6}$m, at least 90 % by mole of which, preferably at least 95% by mole, is at least one aromatic polyimide or copolyimide the recurrent unit of which corresponds to the following formula (I):

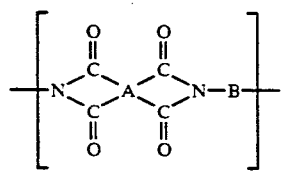

(I)

where A represents a tetravalent aromatic radical at least 50% by mole of which are represented by the following formula (II):

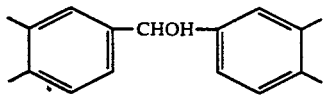

(II)

and B represents a bivalent aromatic radical or a mixture of bivalent aromatic radicals.

B can notably represent at least one radical corresponding to one of the following formulas (VI) to (IX):

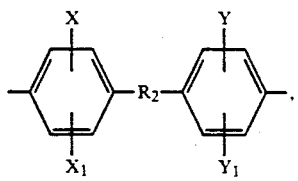

(IV)

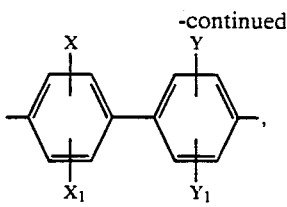

(V)

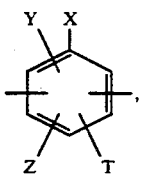

(VI)

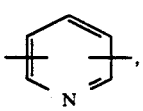

(VII)

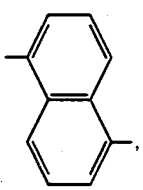

(VIII)

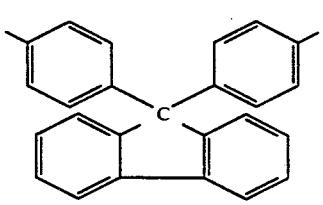

(IX)

X,Y,X$_1$,Y$_1$,Z,T, identical or different, being selected from the group consisting of hydrogen, the hydroxyl-OH radical, the carboxyl-COOH radical, the alkyl or alkoxy radicals having 1 to 3 atoms of carbon; R$_2$ being a bivalent radical selected from the group consisting of the following radicals: —O—, —S—, —SO$_2$—, —CO—, CH$_2$—, —C(CH$_3$)$_2$—, —C(CF$_3$)$_2$—.

Said aromatic polyimide or copolyimide contained in the gas separation membrane according to the invention is advantageously prepared by reacting (in a polycondensation reaction), in an appropriate solvent and generally in stoichiometric conditions or in conditions close to stoichiometry (deviation generally lower than 30%, preferably 20% by mole in relation to the stoichiometric proportions):

on one hand, at least one aromatic diamine, for example represented by the following formula (III):

(III)

where R$_1$ is a bivalent radical corresponding to one of the following formulas (IV) to (IX):

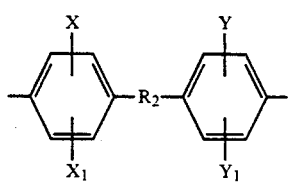

(IV)

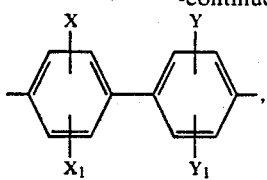

(V)

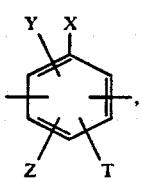

(VI)

(VII)

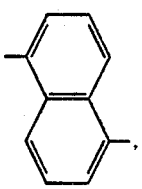

(VIII)

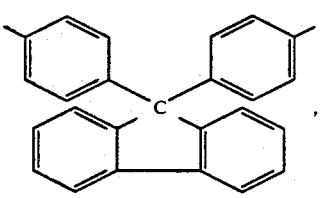

(IX)

X,Y,X$_1$,Y$_1$,Z,T, identical or different, being selected from the group consisting of hydrogen, the hydroxyl-OH radical, the carboxyl-COOH radical, the alkyl or alkoxy radicals having 1 to 3 atoms of carbon; R$_2$ being a bivalent radical selected from the group consisting of the following radicals: —O—, —S—, —SO$_2$—, —CO—, —CH$_2$—, —C(CH$_3$)$_2$—, —C(CF$_3$)$_2$—, with, on the other hand:

either at least one tetra-ester or one diacid-ester derived from 3,3',4,4'-tetracraboxylic benzhydrol acid and represented by the following formula (X):

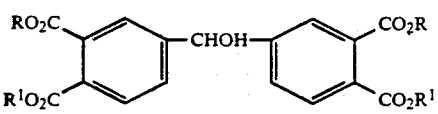

(X)

where R and R', identical or different, are monovalent radicals of hydrocarbons each one preferably comprising 1 to 13 atoms of carbon, for example lower alkyls containing 1 to 13 atoms of carbon, cyclo-alkyls or aryls comprising 6 to 13 atoms of carbon, and R can also represent an atom of hydrogen (R' being then defined as above);

or a mixture containing:

* 50 to 95% by mole of at least one tetra-ester or one diacid-diester derived from 3,3',4,4'-tetracarboxylic benzhydrol acid and represented by the following formula (X):

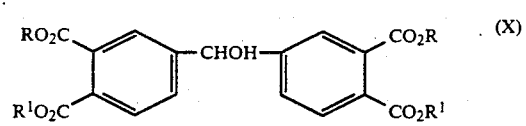

(X)

and

* 5 to 50% by mole of at least one tetra-ester or one diacid-diester derived from at least one tetracarboxylic aromatic acid and represented by the following formula (XI):

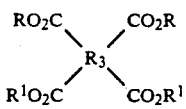

(XI)

or of at least one di-anhydride derived from at least one tetracarboxylic aromatic acid and represented by the following formula (XII):

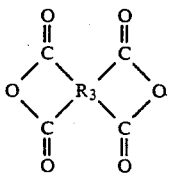

(XII)

where, in formulas (X), (XI) and (XII), R and R', identical or different, ar monovalent radicals of hydrocarbons each one comprising 1 to 13 atoms of carbon, for example lower alkyls containing 1 to 13 atoms of carbon, cyclo-alkyls or aryls comprising 6 to 13 atoms of carbon, and R can also represent an atom of hydrogen (R' being then defined as above); R$_3$ is a tetravalent radical substituted or not, preferably selected from those represented hereafter:

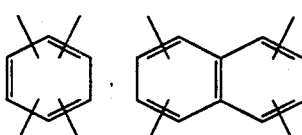

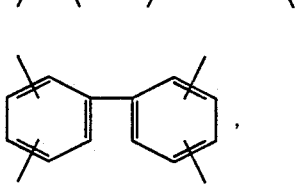

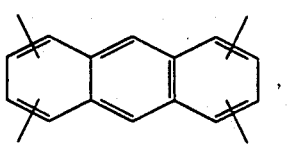

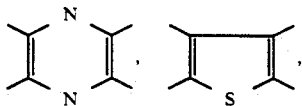

-continued

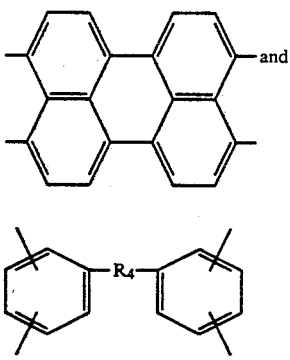

where $R_4$ represents a bivalent radical selected from the following radicals: —O—, —S—, —SO$_2$—, —CO—, CH$_2$—, —C(CH$_3$)$_2$—and —C(CF$_3$)$_2$—.

The polycondensation reaction can be carried out according to any conventional process, preferably according to the process described in U.S. Pat. No. 4,736,015.

Among the tetra-esters or diacid-diesters derived from the 3,3',4,4'-tetracarboxylic benzhydrol acid or derived from at least one tetracarboxylic aromatic acid generally used for preparing the polyimides or copolyimides considered in the present invention, the following can be cited: the symmetric tetra-esters, i.e. the compounds of formula (X) or (XI) in which radicals R and R' are identical, such as tetramethyl ester, tetraethyl ester, tetrabutyl ester; the dissymmetric tetra-esters represented by formula (X) or (XI) with radicals R and 4' alkyl and/or aryl, different, such as diphenyl dimethyl ester, dibutyl dimethyl ester, diphenyl diethyl ester; the bis(ortho-acids-esters) more commonly called diesters, i.e. the compounds of formula (X) or (XI) in which R is an atom of hydrogen and R' an alkyl radical, such as for example methyl diester, ethyl diester, n-propyl diester, isopropyl diester, n-butyl diester, isobutyl diester, amyl diester, hexyl diester, 2-hydroxyethyl diester.

Most generally, the dissymmetric tetra-esters and the diesters are not pure compounds but a mixture of isomers; for example, the methyl diester can be a mixture, in variable proportions, of 3,3'-dicarboxy 4,4'-dimethoxycarbonyl, of 4,4'-dicarboxy 3,3'-dimethoxycarbonyl and of 3,4'-dicarboxy 4,3'-dimethoxycarbonyl of the considered acids.

According to a preferred preparation embodiment, at least one aromatic polyimide or copolyimide is prepared by dissolving in an appropriate solvent at least one aromatic diamine of formula (III) and preferably substantially equimolecular amount of at least one compound of formula (X) or of a mixture of compounds of formula (X) and (XI) or (X) and (XII). The reaction mixture formed by the solvent and the reagents is then heated up to a temperature advantageously higher than 80° C., generally ranging from 80° to 400° C., preferably from 100° to 250° C., until the composition reaches the required viscosity. The temperature is generally set at such a value that the reaction of the amine functions on the tetracarboxylic acid(s) derivatives is carried out at a reasonable velocity.

The solvents which the polyimides or copolyimides considered in the invention are prepared with are usually polar organic compounds, i.e. comprising a heteroatom such as O, N, S, P, inert in relation to the monomers and the polymers. Among these solvents, the following can be notably cited: the phenols, such as phenol, the cresols, the xylenols, the chlorophenols, the mono and diethers of glycols, such as for example those of ethyleneglycol and of diethyleneglycol, the amides, such as for example methylformamide, dimethylformamide, hexamethylphosphotriamide, methylacetamide, dimethylacetamide, the ureas, such as for example tetramethylurea, the heterocyclic compounds, such as for example pyridine, quinoline, dioxane, tetrahydrofurane, N-methylpyrrolidone, N-acetylpyrrolidone, tetramethylenesulfone, the sulfones and sulfoxides, such as for example dimethylsulfone and dimethylsulfoxide.

These solvents can be used alone or mixed together, or else mixed with other liquid organic compounds among which the alcohols, such as methanol, ethanol, propanol, isopropanol, the butanols, benzyl alcohol; the ketones, such as for example acetone, 2-butanone, methylisobutylketone, diisopropylketone, cyclohexanone, acetophenone; the aromatic hydrocarbons, such as benzene, toluene, the xylenes, the solvent naphtha; the halogenated aromatic hydrocarbons, such as chlorobenzene, the dichlorobenzenes, the chlorotoluenes; the aliphatic and aromatic esters of the aliphatic and aromatic carboxylic acids, such as for example the acetates of methyl, of isopropyl, of butyl, of phenyl, methyl benzoate; ethers, such as dibutyl ether, diphenyl ether.

The initial concentration of monomers in the reaction solvent is not critical, but it generally ranges between 10 and 80% by weight.

The volatile products (water and/or alcohols) formed during the reaction can be left in the medium, but they can also be removed by distillation as they form, which allows controlling the extent of the reaction.

It is optionally possible to react, on the polyimide or copolyimide prepared thereby, a mono or bifunctional simple or polymeric compound containing at least one grouping selected from the group consisting of the isocyanates, the epoxides, the carboxylic acids anhydrides, the carboxylic acids halogenides, the alkyl titanates, the siloxanes. The grafting of a monofunctional simple or polymeric compound on the polymeric chain of the polyimide or of the copolyimide generally allows increasing the solubility of the latter ones and modifying their permeametric properties on account of the change in the structure of the macromolecular chain. The use of bifunctional simple or polymeric compounds can allow to obtain cross-linked polyimide or copolyimide films. In this latter case, the grafting is performed on the film already formed, the cross-linking having the effect of making the polyimide or the copolyimide insoluble.

The film contained in the gas separation membranes according to the invention is usually prepared by dissolving said polyimide(s) or copolyimide(s), for example at a temperature ranging between the room temperature and 150° C., at a concentration generally ranging from 3 to 35%, preferably from 5 to 25% by weight, in at least one appropriate organic solvent.

Said solvent is for example selected, according to the solubility of the polyimide or copolyimide, among the group consisting of N-methylpyrrolidone, dimethylformamide, dimethylacetamide, dimethylsulfoxide, o-, m- or p-cresol, the phenolic derivatives, the halogenated hydrocarbons, dioxane and tetrahydrofurane.

The obtained solution is generally cooled down to the room temperature (between 15° and 25° C.) and preferably filtered and degassed. The solution is then spread with a commercial knife or bar applicator on a plane (support) such as a glass plate, in order to obtain a film of said solution with a thickness generally ranging from 10 to $200.10^{-6}$m, preferably from 30 to $150.10^{-6}$m.

The solvent is then progressively evaporated step by step, generally under vacuum or under a stream of inert gas(es), for example at temperatures ranging from 80° to 220° C. for 6 to 22 hours. The polyimide(s) or copolyimide(s) film obtained thereby is then detached from the support, for example by immersing the set formed by the film and the support in one or several successive water baths, at temperatures generally different and ranging for example from 10° to 80° C. The film is then dried again under vacuum or under a stream of inert gas(es), preferably step by step, for example at temperatures ranging from 80° to 400° C., preferably from 90° to 350° C., for 6 to 22 hours. This final thermal treatment generally allows improving the permeametric properties of said film.

A dense film is thus obtained, the thickness of which ranges from $0.05.10^{-6}$ to $20.10^{-6}$m, preferably from $0.1.10^{-6}$ to $15.10^{-6}$m. Too thick a film would have a low permeability, whereas too thin a film would show an extreme sensitivity to the slightest defect, which might lead to a non-selective flow of gases.

The separation membranes according to the invention generally comprise, apart from said dense film, at least one porous structure supporting said film; in that case, these are called membranes of the asymmetric type. These asymmetric structures can be for example directly obtained with the conventional phase inversion techniques or by the controlled deposition of a dense film on an already existing porous structure; in the latter case, they are called composite membranes. These membranes have for example a plane or a filamentary shape, or else the form of hollow tubes or fibers.

The separation membranes according to the invention can be notably utilized for the dehydration or the deacidizing of a mixture of gaseous hydrocarbons, for the separation of hydrogen from a mixture of gaseous hydrocarbons, for the separation of oxygen and nitrogen and, more generally, in gas separation processes.

The examples hereafter illustrate the invention without however limiting the scope thereof.

In these examples, the intrinsic viscosity is determined at 30° C. in N-methylpyrrolidone.

The measuring of permeability to hydrogen, to carbon monoxide, to methane, to oxygen and to nitrogen is carried out on the dense polyimide or copolyimide films at 20° C., at an upstream pressure of 1 MPa and vacuum downstream. The measuring of permeability to water is achieved at 50° C. with nitrogen loaded with steam. The upstream pressure is 1 MPa, the partial water pressure is 0.5 and vacuum is applied downstream.

The permeability to the different gases is calculated by means of the following formula:

$$P = \frac{V}{t \Delta P} \cdot \frac{1}{A}$$

It is expressed in $cm^3/(cm^2 \cdot s \cdot cm\ Hg)$.

V represents a volume of gas (in $cm^3$, NTP) passing across the dense film, t represents the permeation duration (in s), $\Delta P$ represents the considered gas pressure difference between the upstream and downstream faces of the film and A represents the surface of the film.

The permeability coefficient is calculated by means of the following formula:

$$p = P \times e$$

and is expressed in barrers (1 barrer=$10^{-10}$ $cm^3 \cdot cm/(cm^2\ s.\ cm\ Hg)$) where P represents the measured permeability and e the thickness of the film.

The selectivity for the separation of two gases i and j is given by the following formula:

$$\alpha i/j = \rho i/\rho j$$

where $\rho i$ and $\rho j$ are respectively the permeability coefficients of gases i and j.

EXAMPLE 1

A mixture of 388.3 g of methyl diester of 3,3',4,4'-tetracarboxylic benzhydrol acid and of 198.27 g of bis (amino-4 phenyl) methane in 585 g of m-cresol is heated in a nitrogen stream and under stirring in an oil bath which allows to progressively increase the temperature of the mixture up to 190° C. The temperature stages are 1 hour at 50° C., 1 hour at 110° C., 1 hour at 150° C. and 2 hours at 190° C. During the reaction, m-cresol is progressively added in order to bring the dry product concentration to about 30% by weight at the end of the temperature cycle.

The obtained solution is diluted to obtain a dry product concentration ranging from 15 to 20% by weight, then (hot) filtered and precipitated with a strong stirring in a large methanol excess (of about 10 volumes for 1 volume of solution). The obtained mixture is filtered in order to separate the polymer particles. The polymer is washed again several times with methanol, then dried at 90° C. in a vacuum chamber for 24 hours.

The polyimide prepared thereby shows an intrinsic viscosity of 0.62 dl/g.

EXAMPLE 2

10 g of the polyimide prepared in example 1 are dissolved under stirring in 90 g of N-methylpyrrolidone at a temperature of about 100° C. The solution is cooled down to the room temperature, filtered on a 0.5micron FLUOPORE filter and degassed.

Under a class 100 light flux hood, the solution is spread by means of a bar applicator on a glass plate in order to obtain a solution film with a thickness of about $100.10^{-6}$m.

The solvent is evaporated under vacuum for 8 hours at 100° C. and 4 hours at 180° C. The polyimide film is then detached from the support by alternately plunging it into water at 20° C. and water at 60° C. This film is then dried again under vacuum for 8 hours at 100° C. and 4 hours at 180° C.

A dense film with a thickness of $10.10^{-6}$m is thus obtained. This film is subjected to a thermal treatment at 300° C. for 4 hours in a nitrogen stream.

The results of the permeability tests are shown in Table 1.

TABLE 1

| ρ (barrer) | | | | α | | |
|---|---|---|---|---|---|---|
| H₂O | H₂ | CO₂ | CH₄ | H₂O/CH₄ | H₂/CH₄ | CO₂/CH₄ |
| 1,000 | 2.8 | 0.32 | 0.0042 | 236.000 | 670 | 76 |

EXAMPLE 3

388.3 g of methyl diester of 3,3',4,4'-tetracarboxylic benzhydrol acid are admixed with 306.4 g of (3,3',5,5'- tetraethyl 4,4'-diamino diphenyl) methane according to the process of example 1.

The obtained polyimide is given the form of a film according to the process of example 2.

The results of the permeability tests are shown in Table 2.

EXAMPLE 4

388.3 g of methyl diester of 3,3',4,4'-tetracarboxylic benzhydrol acid are admixed with 398.5 g of (3,3'-dimethyl 5,5'-diisopropyl 4,4'-diamino diphenyl) methane according to the process of example 1. The obtained polyimide is given the form of a film according to the process of example 2.

The results of the permeability tests are shown in Table 2.

TABLE 2

| Example | ρ (barrer) | | | α | |
|---|---|---|---|---|---|
| | $H_2$ | $CO_2$ | $CH_4$ | $H_2/CH_4$ | $CO_2/CH_4$ |
| 3 | 21 | 9.5 | 0.39 | 54 | 24 |
| 4 | 29 | 15.5 | 0.6 | 48 | 26 |

EXAMPLE 5

388.3 g of methyl diester of 3,3',4,4'-tetracarboxylic benzhydrol acid are admixed with 348.45 g of 9,9 bis (4-amino phenyl) fluorene according to the process of example 1. The obtained polyimide shows an intrinsic viscosity of 0.45 dl/g and is given the form of a dense film according to the process of example 2.

The results of the permeability tests are shown in Table 3.

EXAMPLE 6

388.3 g of methyl diester of 3,3',4,4'-tetracarboxylic benzhydrol acid are admixed with 164 g of tetramethyl-paraphenylene diamine according to the process of example 1. The obtained polyimide shows an intrinsic viscosity of 0.86 dl/g and is given the form of a dense film according to the process of example 2.

The results of the permeability tests are shown in Table 3.

TABLE 3

| Example | ρ (barrer) | | | | α | | |
|---|---|---|---|---|---|---|---|
| | $H_2$ | $CO_2$ | $CH_4$ | $O_2$ | $H_2/CH_4$ | $CO_2/CH_4$ | $O_2/N_2$ |
| 5 | 9.7 | 3.0 | 0.09 | — | 108 | 33 | — |
| 6 | 115 | 58.7 | 2.2 | 14.3 | 52.3 | 26.7 | 5.0 |

We claim:

1. A gas separation membrane comprising at least one film of a thickness ranging from $0.05.10^{-6}$ to $20.10^{-6}$m, at least 90% by mole of which is at least one aromatic polyimide or copolyimide, the recurrent unit of which has formula (I):

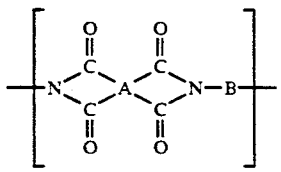
(I)

where A represents a tetravalent aromatic radical, at least 50% by mole of which have formula (II):

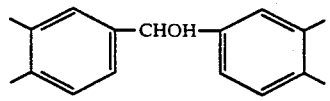
(II)

and B represents a bivalent aromatic radical or a mixture of bivalent aromatic radicals.

2. A membrane according to claim 1, wherein at least 95% by mole of said film is at least one aromatic polyimide or copolyimide, the recurrent unit of which has formula (I).

3. A membrane according to claim 1 wherein said film has at thickness ranging from $0.1.10^{-6}$ to $15.10^{-6}$m.

4. A membrane according to claim 1, wherein said aromatic polyimide or copolyimide is prepared by reacting at least one aromatic diamine of the formula (III):

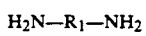
(III)

where $R_1$ is a bivalent radical of one of the following formulas (IV) to (IX):

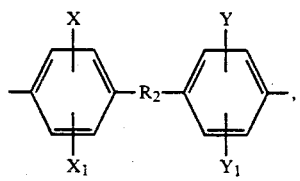
(IV)

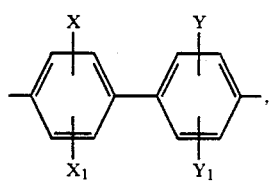
(V)

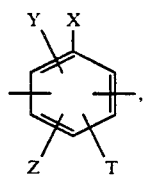
(VI)

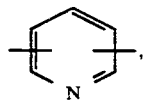
(VII)

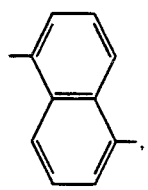
(VIII)

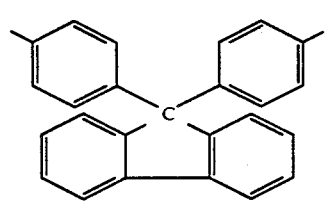
(IX)

X, Y, X₁, Y₁, Z, and T, identical or different, being selected from the group consisting of H, OH, COOH, C$_{1-3}$-alkyl, and C$_{1-3}$-alkoxy; R$_2$ being selected from the group consisting of the following radicals: —O—, —S—, —SO$_2$—, —CO—, CH$_2$—, —C(CH$_3$)$_2$—, and —C(CF$_3$)$_2$—, with at least one tetra-ester or one diacid-ester derived from 3,3'4,4'-tetracarboxylic benzhydrol acid and represented by the formula (X):

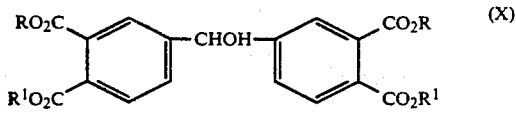

where R and R¹, identical or different, are monovalent radicals of hydrocarbons, each one having 1 to 13 atoms of carbon, and R can also represent hydrogen.

5. A membrane according to claim 4, wherein after preparing said aromatic polyimide or copolyimide, at least one mono- or bifunctional, simple or polymeric compound containing at least one group selected from the group consisting of the isocyanates, the epoxides, the carboxylic acid anhydrides, the carboxylic acid halogenides, the alkyl titanates, and the siloxanes is reacted on said polyimide or copolyimide.

6. A membrane according to claim 1, wherein said aromatic polyimide or copolyimide is prepared by reacting at least one aromatic diamine represented by the following formula (III):

$$H_2N—R_1—NH_2 \quad (III)$$

where R₁ is a bivalent radical corresponding to one of the following formulas (IV) to (IX):

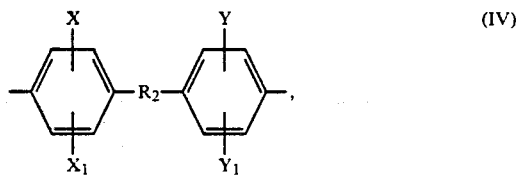 (IV)

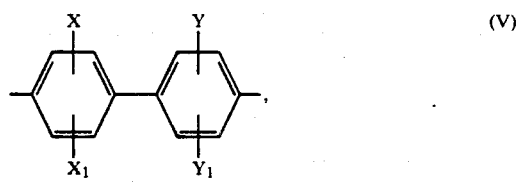 (V)

 (VI)

 (VII)

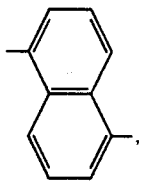 (VIII)

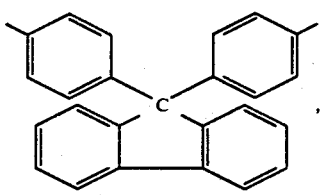 (IX)

X, Y, X₁, Y₁, Z, and T, identical or different, being selected from the group consisting of H, OH, COOH, C$_{1-3}$-alkyl, and C$_{1-3}$-alkoxy; R$_2$ being a bivalent radical selected from the group consisting of the following radicals: —O—, —S—, —SO$_2$—, —CO—, —CH$_2$—, —C(CH$_3$)$_2$—, and —C(CF$_3$)$_2$, with a mixture containing 50 to 95% by mole of at least one tetra-ester or one diacid-diester derived from 3,3',4,4'-tetracarboxylic benzhydrol acid and represented by the following formula (X):

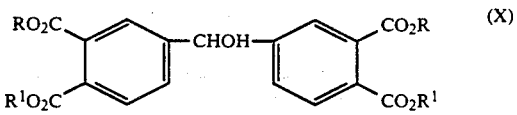

and 5 to 50% by mole of at least one tetra-ester or one diacid-diester derived from at least one tetracarboxylic aromatic acid and represented by the following formula (XI):

or of at least one dianhydride derived from at least one tetracarboxylic aromatic acid and represented by the following formula (XII):

where, in formulas (X), (XI) and (XII), R and R', identical or different, are monovalent radicals of hydrocarbons, each one comprising 1 to 13 atoms of carbon, and R can also represent an atom of hydrogen; R₃ is a tetravalent radical, substituted or not, selected from those represented hereinafter:

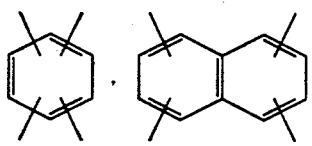

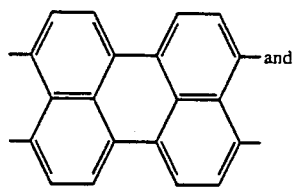

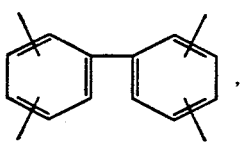

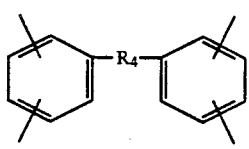

where R₄ represents a bivalent radical selected from the following radicals: $-O-$, $-S-$, $-SO_2-$, $-CO-$, $-CH_2-$, $-C(CH_3)_2-$, and $-C(CF_3)_2-$.

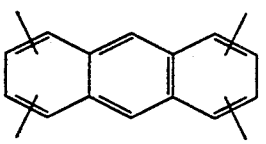

7. A process for the dehydration of a mixture of gaseous hydrocarbons, comprising passing said mixture through a membrane of claim 1 under dehydration conditions.

8. A process for the deacidizing of a mixture of gaseous hydrocarbons, comprising passing said mixture through a membrane of claim 1 under deacidization conditions.

9. A process for the separation of hydrogen from a mixture of gaseous hydrocarbons, comprising passing said mixture through a membrane of claim 1 under separation conditions.

10. A process for the separation of components of a mixture of oxygen and nitrogen, comprising passing said mixture through a membrane of claim 1 under separation conditions.

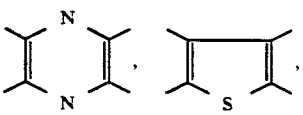

* * * * *